2,897,216
PROCESS FOR THE PREPARATION OF STEROIDAL DIENES AND INTERMEDIATES OBTAINED THEREBY

Eugene P. Oliveto, Bloomfield, and David H. Gould, Leonia, N.J., assignors to Schering Corporation, Bloomfield, N.J., a corporation of New Jersey No Drawing. Application November 1, 1954
Serial No. 466,207
10 Claims. (Cl. 260—397.45)

The present invention relates to the manufacture of $\Delta^1$-derivatives of cortisone and hydrocortisone and their 21-esters, these derivatives being $\Delta^{1,4}$-steroidal dienes which are designated chemically as 1,4-pregnadien-17$\alpha$,21-diol-3,11,20-trione and 1,4-pregnadien-17$\alpha$,11$\beta$, 21-triol-3,20-dione, and their 21-esters. These compounds have been found to have unusual adrenal cortical hormonal properties, being more active than cortisone and hydrocortisone (Kendall's Compounds E and F) and their esters, while being free, at least to a large extent, of the undesirable side reactions that frequently accompany the use of cortisone, hydrocortisone and their esters.

The products obtained by the process of the present invention have the following structural formulae:

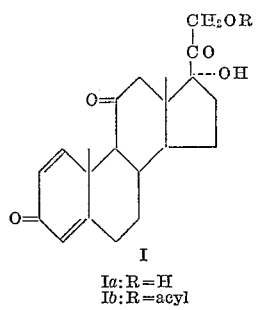
I
Ia: R=H
Ib: R=acyl

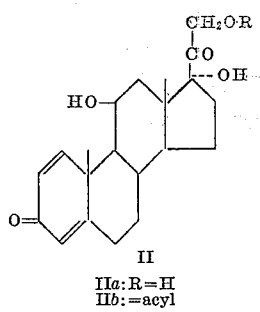
II
IIa: R=H
IIb: R=acyl

In the above formulae, R is H or acyl, the acyl group being preferably lower alkanoyl, such as formyl, acetyl, propionyl, butyryl and valeryl, and especially acetyl.

It is the general object of the present invention to provide a chemical process for producing Compounds I and II from available or readily obtainable saturated pregnan-17$\alpha$,21-diol-3,20-diones having in the 11-position a keto or an $\alpha$- or $\beta$-hydroxy group, and likewise from the 21-esters of such compounds, the nucleus being of either normal or allo configuration.

It is a further object of the invention to provide 2,4-dihalogenides of the above-mentioned starting materials from which the above-mentioned steroidal dienes may be readily obtained.

We have found that the 21-esters of pregnan-17$\alpha$,21-diol-3,11,20-trione and of pregnan-11,17$\alpha$,21-triol-3,20-dione, can be halogenated at the 2- and 4-positions by treatment with one or more halogens having an atomic weight higher than that of fluorine, to produce the corresponding 2,4-dihalogenides in satisfactory yield. The halogenation at the two positions can be carried out in one or two steps, and in the latter case, different halogens may be employed like chlorine and bromine. The dihalogenide is then treated with a dehydrohalogenating agent to introduce two double bonds into ring A at the 1,2- and 4,5-positions, yielding Compound Ib or IIb. The resulting diene ester can then, if desired, be hydrolyzed in known manner with an acid or base to produce the primary alcohol of the dienes (Ia and IIa).

We prefer to employ bromine as the halogenating agent and the invention will accordingly be further described in connection with the use of such halogen. With bromine, the 2,4-dibromides of the 21-esters of pregnan-17$\alpha$,21-diol-3,11,20-trione and of pregnan-11,17$\alpha$,21-triol-3,20-dione can be readily obtained in good yield. We prefer to effect the dehydrobromination by refluxing with collidine, followed by chromatographic separation of the 1,4-diene-21-ester. In place of collidine, other high-boiling organic bases can be employed, like quinaldine and dimethyl aniline.

Our process is applicable to the allo as well as to the normal pregnan series. Thus, dibromination of allopregnan-17$\alpha$,21-diol-3,11,20-trione 21-acetate and of allopregnan-11$\beta$,17$\alpha$,21-triol-3,20-dione 21-acetate yields the corresponding dibromides (III and IIIa) which upon dehydrobromination give the 21-acetates of the dienes I and II, respectively.

The dienes of 11$\alpha$-hydroxylated steroids can also be prepared in the same manner. Dibromination of pregnan-11$\alpha$,17$\alpha$,21-triol-3,20-dione 21-acetate gives the corresponding 2,4-dibromide (IV) which, upon dehydrohalogenation, gives $\Delta^{1,4}$-pregnadien-11$\alpha$,17$\alpha$,21-triol-3,20-dione 21-acetate (V). Oxidation of V gives Ib (R=acetyl) in good yield. Hydrolysis of V gives $\Delta^{1,4}$-pregnadien-11$\alpha$,17$\alpha$,21-triol-3,20-dione (VI) which, upon oxidation, gives Ia.

The reactions involved in the present invention are typified by the following equations:

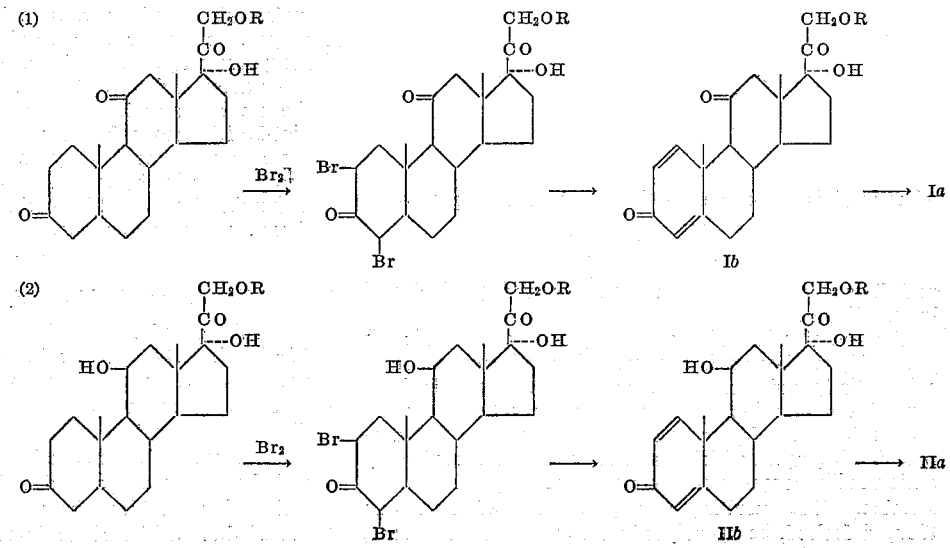

(3) 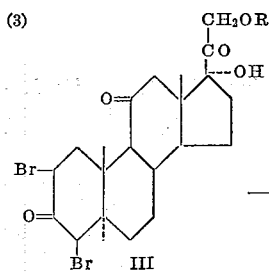 ⟶ Ib ⟶ Ia (4) 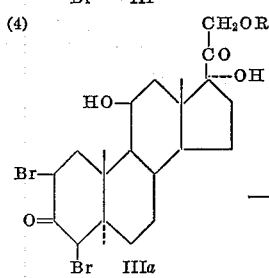 ⟶ IIb ⟶ IIa (5) 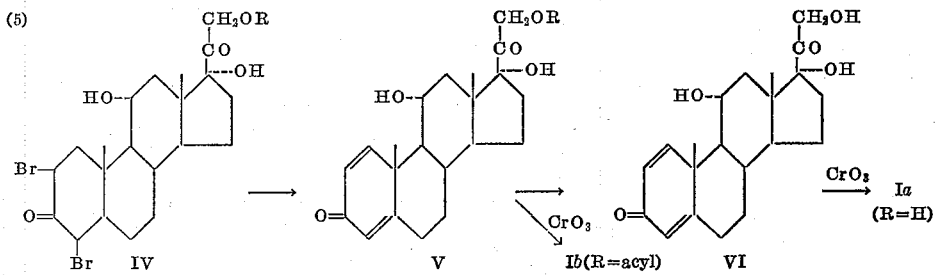

(6) 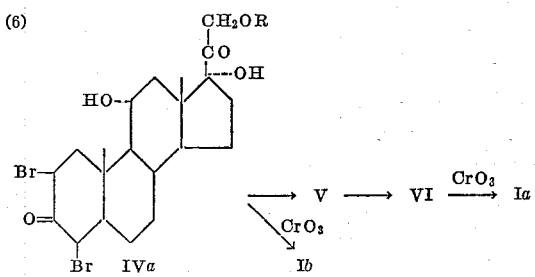 ⟶ V ⟶ VI $\xrightarrow{CrO_3}$ Ia

The novel intermediates obtained by the present invention may be represented by the following formula:

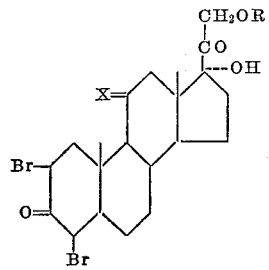

wherein X is a member of the group consisting of =O,

and R is a member of the group consisting of H and lower alkanoyl.

The bromination of the starting compound, which is preferably a 21-ester, is conducted in acetic acid or other substantially anhydrous organic solvent which is inert toward the bromine. It is not necessary to purify the so-formed dibromide prior to reaction with the dehydrobrominating agent which, as already stated, is preferably a high-boiling organic base, collidine being generally most suitable. The resulting doubly unsaturated ester can then, if desired, be hydrolyzed with an alkali metal base, such as carbonates, bicarbonates, and hydroxides in known manner in a suitable neutral solvent like methyl and ethyl alcohols.

In the case of the 11-hydroxy compounds, and particularly the 11α-hydroxy compounds, such hydroxyl group can be oxidized to a keto group either before or after the hydrolysis. While various oxidizing agents may be employed, we have found chromic acid to be an efficient and inexpensive agent for this purpose.

As above indicated, the present invention contemplates the use, among other compounds, of allopregnan-17α,21-diol-3,11,20-trione 21-ester (preferably the acetate) and the corresponding 11-dihydro compound (11β-hydroxyl), and we describe by way of illustration in Examples A and B hereinbelow suitable methods for the preparation of these starting compounds:

EXAMPLE A

*Allopregnan-17α,21-diol-3,11,20-trione 21-acetate*

A solution of 2.00 g. of cortisone acetate (Δ⁴-pregnen-17α,21-diol-3,11,20-trione 21-acetate) in 200 ml. of ethyl acetate is hydrogenated with hydrogen at atmospheric pressure and room temperature using 0.20 g. of 5% palladium on charcoal as catalyst. The reaction is allowed to proceed overnight, the catalyst then removed by filtration and the filtrate evaporated under reduced pressure. The residue is crystallized from acetone to yield allopregnan-17α,21-diol-3,11,20-trione 21-acetate.

EXAMPLE B

*Allopregnan-11β,17α,21-diol-3,11,20-trione 21-acetate*

In a similar fashion 5.0 g. of Compound F 21-acetate (Δ⁴-pregnen-11β,17α,21-triol-3,20-dione 21-acetate) in 750 ml. of ethyl acetate are hydrogenated with hydrogen in the presence of 0.5 g. of 5% palladium on charcoal catalyst to give allopregnan-11β,17α,21-triol-3,20-dione 21-acetate.

Suitable methods for the preparation of the dienes of the present invention are described in the following examples, it being understood that these are presented solely by way of illustration and not as indicating the limits of the invention.

EXAMPLE 1

A solution of 1 g. of allopregnan-17α,21-diol-3,11,20-trione 21-acetate in 15 ml. of acetic acid is brominated by the addition of 0.80 g. of bromine in 10 ml. of acetic acid. Addition of water precipitates the 2,4-dibromoallopregnan-17α,21-diol-3,11,20-trione 21-acetate.

Without purification, the dibromide (1.5 g.) is refluxed in 50 ml. of S-collidine for 1 hour. Chloroform and water are added, the organic extract washed with dilute sulfuric acid, then with water, and dried and evaporated. The crude product is chromatographed on Florisil to give 1,4-pregnadien-17α,21-diol-3,11,20-trione-21-acetate (Ib, R=acetyl) M.P. 232–235°(dec.).

EXAMPLE 2

In the manner described in Example 1, pregnan-17α, 21-diol-3,11,20-trione 21-acetate is brominated with 2 equivalents of bromine, and dehydrobrominated by means of collidine to yield Ib.

EXAMPLE 3

In a similar fashion, allopregnan-11β,17α,21-triol-3,20-dione 21-acetate is brominated at positions 2 and 4, and dehydrobrominated with collidine to give Δ¹,⁴-pregnadien-11β,17α,21-triol-3,20-dione 21-acetate (IIb, R=acetyl) M.P. 234–238°; [α]_D+114° (dioxane), ϵ243 max. 15,000 (MeOH).

EXAMPLE 4

In a similar fashion, pregnan-11β,17α,21-triol-3,20-dione 21-acetate is dibrominated with 2 moles of bromine and dehydrobrominated with collidine to give IIb.

EXAMPLE 5

A mixture of 1.0 g. of the 21-acetate of 1,4-pregnadien-17α,21-diol-3,11,20-trione, 20 ml. of methanol, 5 ml. of water and 0.3 g. of potassium bicarbonate is refluxed 10 minutes, the excess alkali neutralized with acetic acid, and the methanol removed under reduced pressure to precipitate 1,4-pregnadiene-17α,21-diol-3,11,20-trione (Ia), M.P. 230–233° [α]_D+174° (dioxane), ϵ238 max. 15,500 (MeOH).

EXAMPLE 6

In the manner described in Example 5, the 21-acetate of 1,4-pregnadien-11β,17α,21-triol-3,20-dione is hydrolyzed with potassium bicarbonate in aqueous methanol to give the free alcohol (IIa), M.P. 238–241°, [α]_D=105° (dioxane), ϵ243 max. 14,700 (MeOH).

EXAMPLE 7

A solution of 2.0 g. of pregnan-11α,17α,21-triol-3,20-dione 21-acetate in 25 ml. of acetic acid is brominated in positions 2 and 4 by the addition of 1.60 g. of bromine in 15 ml. of acetic acid. Crude 2,4-dibromopregnan-11α, 17α,21-triol-3,20-dione 21-acetate is precipitated by the addition of water.

Dehydrobromination with 100 ml. of collidine for 1 hr. gives, after chromatography, Δ¹,⁴-pregnadiene-11α,17α,21-triol-3,20-dione 21-acetate (IIb, V).

Hydrolysis with potassium bicarbonate in aqueous methanol for 10 minutes at reflux gives Δ¹,⁴-pregnadien-11α,17α,21-triol-3,20-dione (IIa).

Oxidation of the acetate (IIb) with CrO₃, N-bromoacetamide, or N-bromosuccinimide yields Ib, while oxidation of VI with N-bromoacetamide or N-bromosuccinimide gives Ia.

The present application is a continuation-in-part of our co-pending application Serial No. 308,502, filed September 8, 1952, now U.S. Patent No. 2,783,254.

We claim:

1. In a process for the manufacture of 1,4-pregnadien-17α,21-diol-3,11,20-trione and its 21-acetate, the steps which comprise reacting pregnan-11α,17α,21-triol-3,20-dione 21-acetate with bromine to form the 2,4-dibromide, heating and reacting the dibromide with a high boiling organic base to effect di-dehydrobromination and produce the corresponding 1,4-pregnadiene compound, and oxidizing the 11α-hydroxyl to a keto group.

2. Process according to claim 1, including the step of hydrolyzing the 21-acetate group.

3. In a process for the manufacture of 1,4-pregnadien-11β,17α,21-triol-3,20-dione and its 21-acetate, the steps which comprise reacting allopregnan-11β,17α,21-triol-3,20-dione 21-acetate with bromine to form the 2,4-dibromide, and heating and reacting the dibromide with a high boiling organic base to effect di-dehydrobromination and form the corresponding 1,4-pregnadiene compound.

4. In a process for the manufacture of 1,4-pregnadien-11β,17α,21-triol-3,20-dione and its 21-acetate, the steps which comprise reacting pregnan-11β,17α,21-triol-3,20-dione 21-acetate with bromine to form the 2,4-dibromide, and heating and reacting the dibromide with a high boiling organic base to effect di-dehydrobromination and form the corresponding 1,4-pregnadiene compound.

5. Process according to claim 3, including the step of hydrolyzing the 21-acetate group.

6. The process which comprises di-dehydrobrominating an allopregnane of the formula

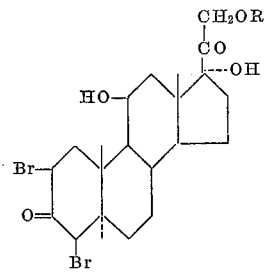

wherein R is lower alkanoyl, by heating and reacting the same with collidine to form the corresponding 1,4-pregnadiene.

7. 2,4-dibromopregnane-11β,17α,21-triol-3,20-dione 21-acetate.

8. 2,4-dibromoallopregnane-11β,17α,21-triol-3,20-dione 21-acetate.

9. 2,4-dibromopregnane-11α,17α,21-triol-3,20-dione 21-acetate.

10. In a process for the manufacture of compounds of the formula:

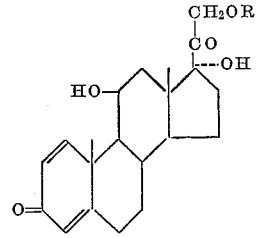

wherein R is lower alkanoyl, the step which comprises heating and reacting a compound of the group consisting of normal and allo-pregnane-2,4-dibromo-11β,17α-diol- 21-OR-3,20-diones, wherein R is as above defined, with a high-boiling organic base, until di-dehydrobromination has been effected at the 1,2- and 4,5-positions.

References Cited in the file of this patent

UNITED STATES PATENTS

| | | |
|---|---|---|
| 2,579,479 | Djerassi | Dec. 25, 1951 |
| 2,659,744 | Schneider | Nov. 17, 1953 |
| 2,703,805 | Rosenkranz | Mar. 8, 1955 |
| 2,773,075 | Wilson et al. | Dec. 4, 1956 |
| 2,852,539 | Day et al. | Sept. 16, 1958 |

OTHER REFERENCES

Rosenkranz: Jour. Am. Chem. Soc., 72, 4081–85 (1950).

Romo: Chem. and Ind., 1952, 783–84.

Inhoffen: Ber., 73, 451–7 (1940).

Butenandt: Ber., 72, 1617–23 (1939).